(12) United States Patent
Chang et al.

(10) Patent No.: US 11,438,928 B2
(45) Date of Patent: Sep. 6, 2022

(54) METHODS FOR ADJUSTING TRANSMISSION PARAMETERS AND COMMUNICATION DEVICE UTILIZING THE SAME

(71) Applicant: Realtek Semiconductor Corp., HsinChu (TW)

(72) Inventors: Wei-Hsuan Chang, HsinChu (TW); Shau-Yu Cheng, HsinChu (TW); Cheng-Deom Hasio, HsinChu (TW); Tsung-Chun Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/169,555

(22) Filed: Feb. 8, 2021

(65) Prior Publication Data

US 2021/0259017 A1 Aug. 19, 2021

(30) Foreign Application Priority Data

Feb. 18, 2020 (TW) .................................. 109105127

(51) Int. Cl.
*H04W 74/08* (2009.01)
*H04W 72/12* (2009.01)

(52) U.S. Cl.
CPC ... *H04W 74/0825* (2013.01); *H04W 72/1252* (2013.01); *H04W 74/0816* (2013.01)

(58) Field of Classification Search
CPC ......... H04W 74/0825; H04W 72/1252; H04W 74/0816
See application file for complete search history.

(56) References Cited

U.S. PATENT DOCUMENTS

| | | | | |
|---|---|---|---|---|
| 7,062,671 B2* | 6/2006 | Ho | ........................ | H04L 49/901 |
| | | | | 365/189.04 |
| 2012/0320759 A1* | 12/2012 | Shao | ..................... | H04W 24/02 |
| | | | | 370/242 |
| 2016/0366702 A1* | 12/2016 | Baba | ..................... | H04L 12/413 |
| 2016/0374070 A1* | 12/2016 | Ghosh | .................. | H04W 74/06 |
| 2017/0188391 A1* | 6/2017 | Rajagopal | ......... | H04W 28/0284 |
| 2018/0324860 A1* | 11/2018 | Mattsson | ............. | H04B 17/318 |
| 2020/0107399 A1* | 4/2020 | Pu | ..................... | H04W 72/0446 |

FOREIGN PATENT DOCUMENTS

| TW | I466489 B | 12/2014 |
|---|---|---|
| WO | 2017116108 A1 | 7/2017 |

\* cited by examiner

*Primary Examiner* — Chi H Pham
*Assistant Examiner* — Weibin Huang
(74) *Attorney, Agent, or Firm* — Winston Hsu (57) ABSTRACT

A communication device includes a radio transceiver and a processor. The radio transceiver is configured to transmit or receive wireless signals and includes a collision detection device. The collision detection device is configured to detect energy in a wireless communication channel during a first time interval before a packet is transmitted by the radio transceiver and accordingly generate a detection result. The first time interval covers a period of time for the radio transceiver to switch from a receiving state to a transmitting state. The processor is configured to adjust at least one transmission parameter according to the detection result.

19 Claims, 6 Drawing Sheets

METHODS FOR ADJUSTING TRANSMISSION PARAMETERS AND COMMUNICATION DEVICE UTILIZING THE SAME

BACKGROUND OF THE INVENTION

1. Field of the Invention

The invention relates to methods for detecting collision and adjusting transmission parameters and applicable to a communication device, more particular to methods for detecting collision which are capable of effectively detecting collision and methods for adjusting transmission parameters which are capable of reducing occurrence of collision by adjusting transmission parameters according to the collision detection result.

2. Description of the Prior Art

Carrier Sense Multiple Access (CSMA) and Collision Avoidance (CA) are the methods to avoid or reduce occurrence of collision in a wireless communication system. However, the CSMA/CA mechanism cannot completely avoid the influence of collisions or interference on the overall transmission. Especially, in the scenario of using WiFi 2 GHz/5 GHz free channels, since the communication channels with limited bandwidth are shared by several different communication systems and the transmissions are undetectable between different communication systems, collisions are more likely to occur.

To reduce occurrence of collisions, effective collision detection becomes a very important issue.

SUMMARY OF THE INVENTION

An objective of the invention is to provide mechanisms or methods for detecting collision and adjusting transmission parameters that are applicable to a communication device, so as to solve the problem that the transmission collision cannot be accurately detected in the conventional art and transmission parameters utilized in subsequent transmissions can be effectively adjusted based on the detection results that can truly reflect the channel environment.

At least one embodiment of the invention provides a communication device comprising a radio transceiver and a processor. The radio transceiver is configured to transmit or receive wireless signals and comprises a collision detection device. The collision detection device is configured to detect energy in a wireless communication channel during a first time interval before a packet is transmitted by the radio transceiver and accordingly generate a detection result. The processor is configured to adjust at least one transmission parameter according to the detection result. The first time interval covers a period of time for the radio transceiver to switch from a receiving state to a transmitting state.

At least another embodiment of the invention provides a method for adjusting a transmission parameter comprising: detecting energy in a wireless communication channel during a first time interval before a packet is transmitted by a communication device and accordingly generating a detection result; and adjusting at least one transmission parameter according to the detection result. The first time interval covers a period of time for a radio transceiver of the communication device to switch from a receiving state to a transmitting state.

By combining the proposed mechanisms or methods for detecting collision and adjusting transmission parameters, the collision can be effectively detected and the transmission parameter can be correctly adjusted according to the detection result. In this manner, the transmission performance can be effectively improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
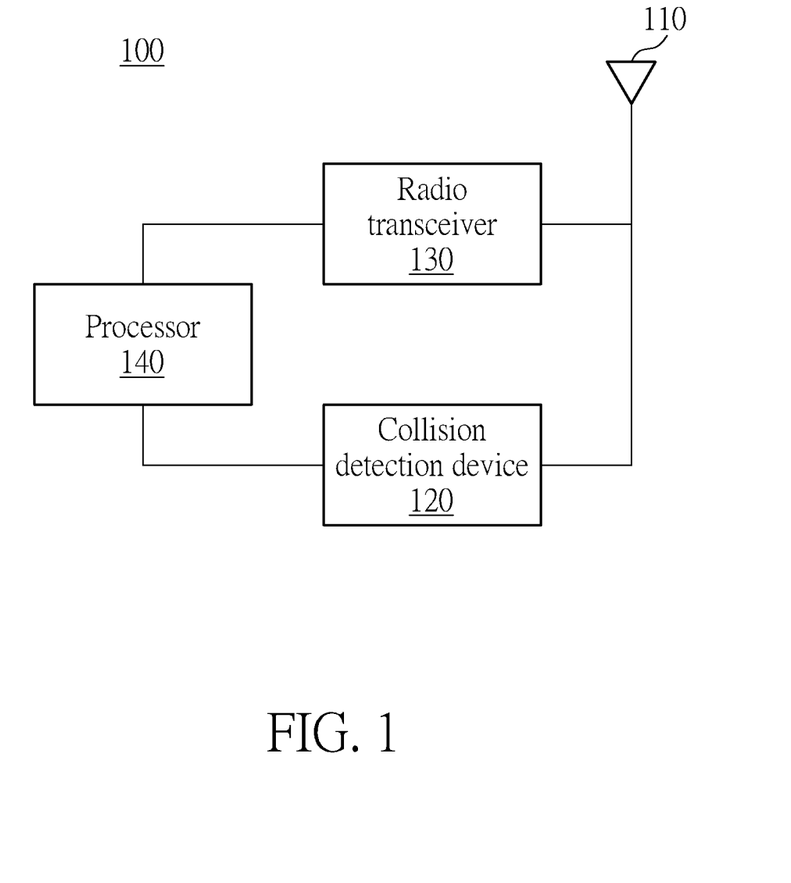
FIG. 1 shows an exemplary block diagram of a communication device according to a first embodiment of the invention.

FIG. 1 shows an exemplary block diagram of a communication device according to a first embodiment of the invention. The communication device 100 may comprise at least one antenna 110, a collision detection device 120, a radio transceiver 130 and a processor 140. It should be noted that, in order to clarify the concept of the invention, FIG. 1 presents a simplified block diagram of a communication device in which only the components relevant to the invention are shown. As will be readily appreciated by a person of ordinary skill in the art, a communication device may further comprise other components not shown in FIG. 1 and configured for implementing the functions of wireless communication and related signal processing.

The radio transceiver 130 is configured to transmit or receive wireless signals via the antenna 110. The collision detection device 120 is configured to detect collision in the period of time before the radio transceiver 130 transmits a packet or after the radio transceiver 130 has transmitted the packet. The collision detection may comprise energy detection and packet characteristic detection. To be more specific, the collision detection device 120 is configured to perform energy detection to detect energy in a wireless communication channel and accordingly generate a detection result and/or perform packet characteristic detection to detect whether there is any packet conforming to a predetermined characteristic being transmitted in the wireless communication channel and accordingly generate a detection result. The processor 140 is configured to adjust at least one transmission parameter according to the detection result. As used herein, "A and/or B" and "at least one of A and B" refer to any combination of one or more of the listed related items (A, B) (for example, A, B or a combination of A and B).

In order to illustrate the operations in the invention, in FIG. 1, the collision detection device 120 is drawn outside the radio transceiver 130, so as to distinguish between the operations of packet transmission and collision detection. However, it should be noted that in the embodiments of the invention, the collision detection device 120 may be implemented as a portion of the radio transceiver 130, or may be implemented as an external device disposed outside of and being independent from the radio transceiver 130. When the collision detection device 120 is implemented as a portion of the radio transceiver 130, the collision detection device 120 may be disposed inside of the radio transceiver 130 and may be implemented as a portion of a baseband signal processing circuit in the radio transceiver 130.

According to a first embodiment of the invention, the communication device 100 may operate in compliance with a Carrier Sense Multiple Access (CSMA) with Collision Avoidance (CA) protocol as defined in the 802.11 standards, and may operate in a half-duplex transmission mode. That is, the radio transceiver 130 is unable to perform packet receiving at the same time when the radio transceiver 130 is transmitting a packet.

Generally, in the CSMA with CA communication environment, before transmitting a packet, all transmission devices have to perform Collision Avoidance, that is, performing Clear Channel Assessment (CCA) to detect whether the channel is clear. If the channel is clear, the transmission device waits for an IFS (Interval Frame Space) time and detects again whether the channel is clear. If the channel is clear, the transmission device determines that the packet can be transmitted.

When a protocol layer (for example, a medium access control (MAC) layer) in the radio transceiver 130 determines that packet can be transmitted via the aforementioned procedure, the MAC layer may generate a corresponding command to inform another protocol layer (for example, a physical layer), thereby notifying the corresponding components of that protocol layer (for example, the baseband signal processing circuit and the radio frequency (RF) signal processing circuit) to switch their operating state from a receiving (RX) state to a transmitting (TX) state, so as to transmit the packet. At the time when the physical layer enters the TX state, CCA cannot be performed anymore if the radio transceiver 130 is implemented as a half-duplex radio transceiver.

Because it takes time to transmit signals between different protocol layers and it also takes time for each protocol layer to switch from one operating state to another, the radio transceiver 130 actually needs a transition time TS_R2T to completely change or switch from a RX state (or, RX mode) to a TX state (or, TX mode). Here, the "completely change" or "completely switch" means that all the layers or components inside of the radio transceiver 130 and associated with the transmission/reception operations have been switched to the corresponding operating state. Such transition time is allowed by the corresponding communication standard (for example, the 802.11 communication standards). Similarly, when the radio transceiver 130 completes packet transmission, the radio transceiver 130 needs a transition time TS_T2R to completely change or switch from the TX state (or, TX mode) to the RX state (or, RX mode).

However, there may be still some undetected transmission occurs in the wireless communication channel during the aforementioned transition time. For example, another device in the communication network may determine to transmit a packet at the time that is very close to the beginning of the transition time. The undetected transmission may collide with the packet transmission of another transmitter. When the packet collision occurs, the receiver may be unable to successfully receive the packet transmitted by the transmitter, causing the packet error rate to increase and affecting the transmission quality. It is more likely to cause the transmitter to mistakenly think that the transmission rate is too high to cause an error to occur, and then reduces the transmission rate. However, when the transmission rate is reduced, the time required to transmit a packet is lengthened, and the possibility of collision then becomes higher, which further worsening the transmission quality.

To solve the problem discussed above, at least one collision detection device (e.g. 120/420) is configured inside the communication device to perform collision detection before or after packet transmission, or during the period of time when packet is being transmitted.

Figure 2:
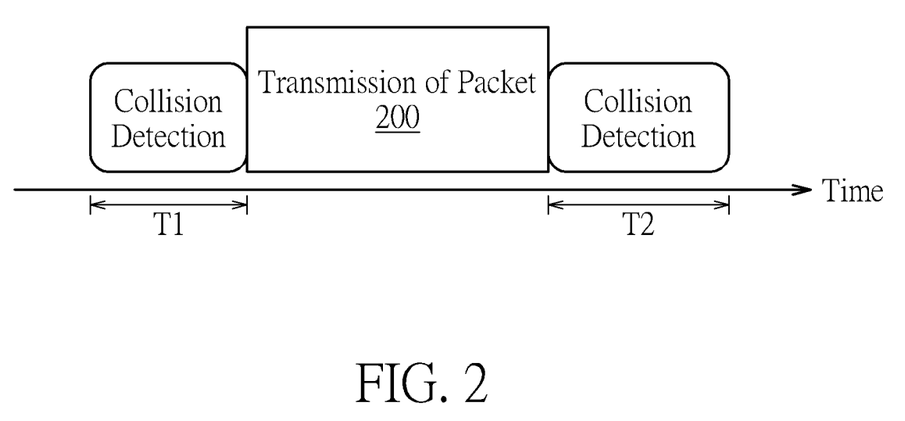
FIG. 2 is a timing diagram of collision detection according to the first embodiment of the invention.

FIG. 2 is a timing diagram of collision detection according to the first embodiment of the invention. The collision detection device 120 may be configured to perform collision detection during the time interval T1 before the packet 200 is transmitted by the radio transceiver 130 and during the time interval T2 after the packet 200 has been transmitted by the radio transceiver 130. The time interval T1 may cover a period of time for the radio transceiver 130 to switch from a receiving (RX) state to a transmitting (TX) state, and the time interval T2 may cover a period of time for the radio transceiver 130 to switch from the TX state to the RX state.

Figure 3:
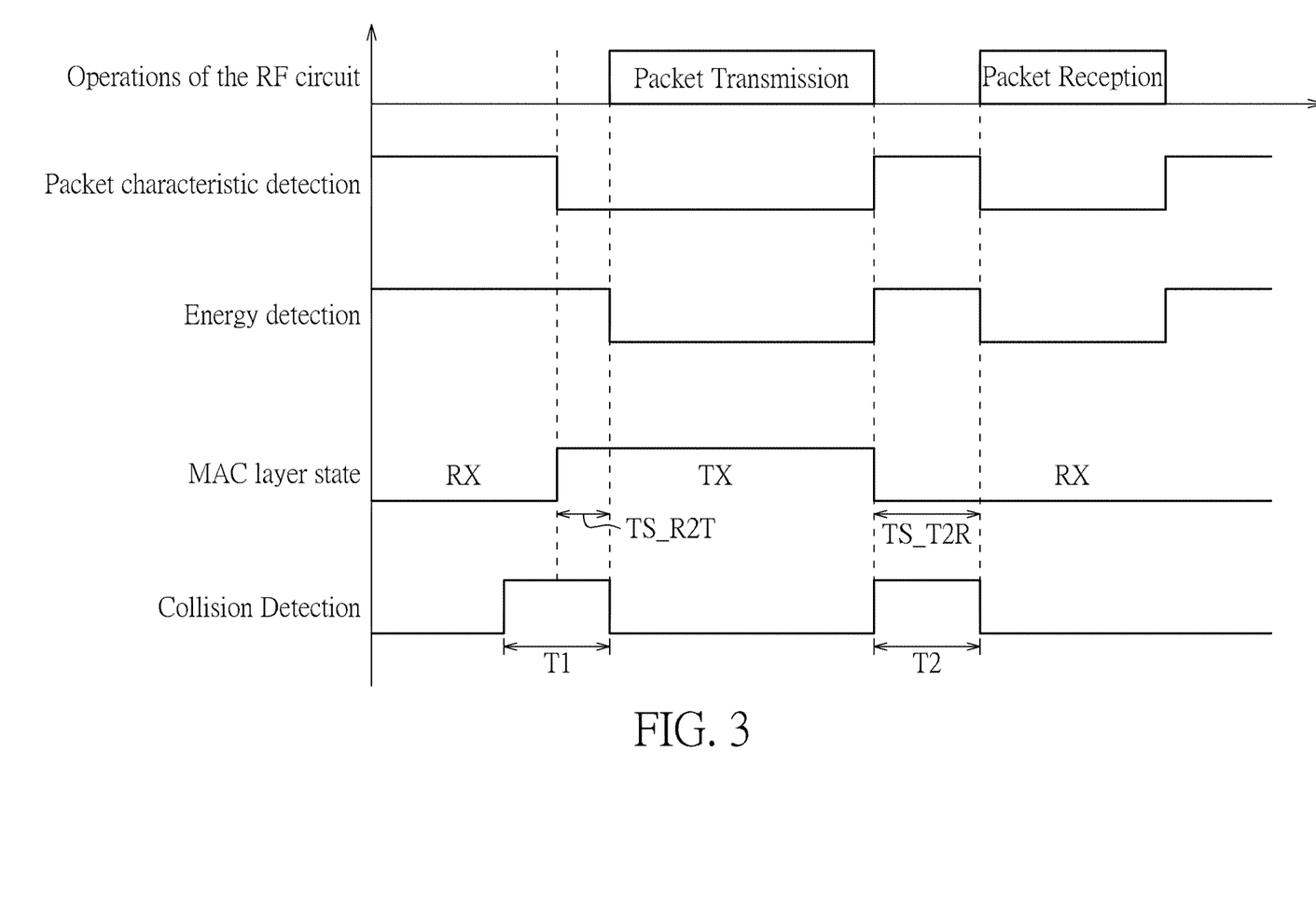
FIG. 3 is a timing diagram of collision detection and state transition according to the first embodiment of the invention.

FIG. 3 is a timing diagram of collision detection and state transition according to the first embodiment of the invention. As shown in FIG. 3, there is some latency between the time of state change at the RF circuit (comprising RF signal processing circuit in the radio transceiver 130 and the antenna) and the time of state change at the MAC layer. That is, at the time when the MAC layer determines that packet transmission can be started and switches from the RX state to the TX state, the RF signal processing circuit cannot immediately switch from the RX state to the TX state as well. In the embodiment of the invention, the collision detection device 120 is configured to perform collision detection during the time interval T1 before a packet is transmitted, and the time interval T1 covers the period of time for the radio transceiver 130 to switch from the RX state to the TX state. Or, from the perspective of the communication protocol layers, the time interval T1 covers latency required for the MAC layer to switch from the RX state to the TX state and required for the RF circuit to switch from the RX state to the TX state, such as the transition time TS_R2T shown in FIG. 3, and the length of the time interval T1 may be longer than or equal to the transition time TS_R2T.

In the embodiments of the invention, the collision detection performed by the collision detection device 120 during the time interval T1 may comprise energy detection. As shown in FIG. 3, the operation of energy detection is enabled (represented as being pulled high) during the time interval T1.

By performing collision detection during the time interval T1, the collision that is occurred during the state transition time of the radio transceiver 130 and is unable to be detected in the conventional art can now be effectively detected.

In addition, in the embodiments of the invention, the collision detection device 120 may be further configured to perform collision detection during the time interval T2 after the packet has been transmitted. The time interval T2 may start when the radio transceiver 130 completes transmission of the packet, and may cover the period of time for the radio transceiver 130 to switch from the TX state to the RX state, or may cover latency required for the MAC layer to switch from the TX state to the RX state and the latency actually required for the RF circuit to perform packet reception after packet transmission, such as the transition time TS_T2R shown in FIG. 3, and the length of the time interval T2 may be longer than or equal to the transition time TS_T2R.

According to an embodiment of the invention, the time interval T2 may be started at the time when the radio transceiver 130 completes packet transmission, and the length of the time interval T2 may be designed as being related to the time required for waiting an Acknowledge message associated with the transmitted packet. The time required for waiting an Acknowledge message may be a Short Interval Frame Space (SIFS) and the length of the time interval T2 may be longer than or equal to length of an SIFS as defined in the communication standards.

In the embodiments of the invention, the collision detection performed by the collision detection device 120 during the time interval T2 may comprise energy detection and packet characteristic detection. As shown in FIG. 3, the operations of energy detection and packet characteristic detection may be enabled (represented as being pulled high) during the time interval T2. In addition, it should be understood that as will be readily appreciated by a person of ordinary skill in the art, the length of the time interval T1 and the length of the time interval T2 and the length of the overlapped period of performing energy detection and packet characteristic detection may be adjusted according to actual design requirement.

By performing collision detection during the time interval T2, the collision that is occurred during the state transition time of the radio transceiver 130 and is unable to be detected in the conventional art can now be effectively detected. In addition, when the radio transceiver 130 is unable to receive the Acknowledge message, it can determine whether the Acknowledge message cannot be received due to the collision occurred in the time interval T2 based on the collision detection result or due to the condition that the packet cannot be correctly transmitted to the receiver side. For example, the length of the time interval T2 may be set as the SIFS. Suppose that the collision detection device 120 detects collision at the beginning of the time interval T2, it can be determined that the transmitted packet has collided with another packet or energy. If the collision detection device 120 detects collision at the end of the time interval T2, it can be determined that the Acknowledge message to be received has collided with another packet or energy.

Figure 4:
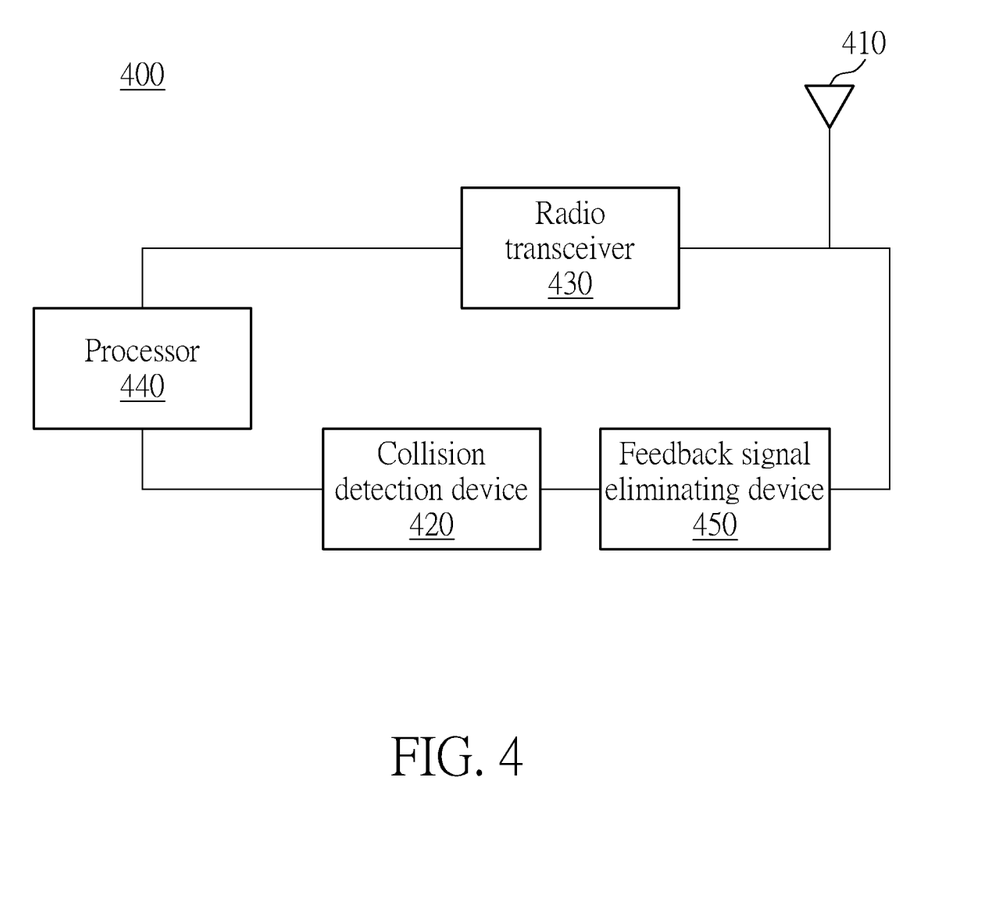
FIG. 4 shows an exemplary block diagram of a communication device according to a second embodiment of the invention.

FIG. 4 shows an exemplary block diagram of a communication device according to a second embodiment of the invention. The communication device 400 may comprise at least one antenna 410, a collision detection device 420, a radio transceiver 430, a processor 440 and a feedback signal eliminating device 450. It should be noted that, in order to clarify the concept of the invention, FIG. 4 presents a simplified block diagram of a communication device in which only the components relevant to the invention are shown. As will be readily appreciated by a person of ordinary skill in the art, a communication device may further comprise other components not shown in FIG. 4 and configured for implementing the functions of wireless communication and related signal processing.

The radio transceiver 430 is configured to transmit or receive wireless signals via the antenna 410. The collision detection device 420 is configured to detect collision in the time interval before the radio transceiver 430 transmits a packet or after the radio transceiver 430 has transmitted the packet, or in the time interval when the radio transceiver 430 is transmitting the packet. The collision detection may comprise energy detection and packet characteristic detection. To be more specific, the collision detection device 420 is configured to perform energy detection to detect energy in a wireless communication channel and accordingly generate a detection result and/or perform packet characteristic detection to detect whether there is any packet conforming to a predetermined characteristic being transmitted in the wireless communication channel and accordingly generate a detection result. The processor 440 is configured to adjust at least one transmission parameter according to the detection result.

According to the second embodiment of the invention, the feedback signal eliminating device 450 is configured to receive a detection signal from the radio interface via the antenna 410 and configured to generate a processed signal according to the detection signal and a transmission signal of the radio transceiver 430. In another embodiment, the feedback signal eliminating device 450 is configured to directly receive the detection signal from the radio transceiver 430 instead of from the antenna 410. To be more specific, the feedback signal eliminating device 450 may generate the processed signal by subtracting the transmission signal from the detection signal. The amplitude of the detection signal may be adequately suppressed before the subtraction, and the feedback signal eliminating device 450 may perform the subtraction in analog or digital domain. The collision detection device 420 is configured to receive the processed signal from the feedback signal eliminating device 450 and detect energy in the wireless communication channel and/or whether there is any packet conforming to the predetermined characteristic being transmitted in the wireless communication channel during the time interval when the radio transceiver 430 is transmitting the packet according to the processed signal.

Similarly, in the embodiments of the invention, the collision detection device 420 and the feedback signal eliminating device 450 may be implemented as a portion of the radio transceiver 430, such as a portion of a baseband signal processing circuit in the radio transceiver 430, or may be implemented as an external device disposed outside of and being independent from the radio transceiver 430.

Figure 5:
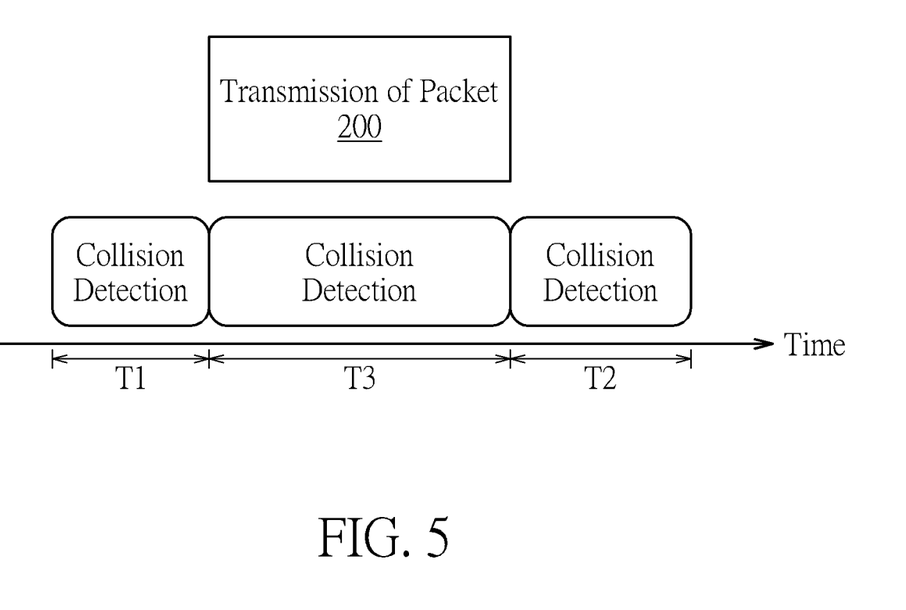
FIG. 5 is a timing diagram of collision detection according to the second embodiment of the invention.

FIG. 5 is a timing diagram of collision detection according to the second embodiment of the invention. The collision detection device 420 may be configured to perform collision detection during the time interval T1 before the packet 200 is transmitted, during the time interval T2 after the packet 200 has been transmitted and during the time interval T3 when the packet 200 is being transmitted. The time interval T1 may cover a period of time for the radio transceiver 430 to switch from a receiving (RX) state to a transmitting (TX) state, the time interval T2 may cover a period of time for the radio transceiver 430 to switch from the TX state to the RX state, and the time interval T3 and the period of time when the radio transceiver 430 is transmitting the packet 200 may be overlapped. Since the timing diagram like the one shown in FIG. 3 and associated with the second embodiment of the invention may be deduced from FIG. 5 based on the operations in the second embodiment of the invention as discussed above, detailed descriptions are omitted here for brevity.

According to the second embodiment of the invention, by additionally performing collision detection during the time interval T3, the collision occurred when the radio transceiver 430 is transmitting the packet can be effectively detected.

According to an embodiment of the invention, the collision detection device 120/420 may perform energy detection according to an energy threshold value. The energy threshold value may be dynamically adjusted by the processor 140/440 according to the system requirements. In addition, the energy threshold value may also be designed according to the communication standards. For example, the energy threshold value may be set to a value that is lower than the lowest energy of a packet as defined by the communication standards. In this manner, the energy of a hidden node can be detected. In addition, according to an embodiment of the invention, the collision detection device 120/420 may perform packet characteristic detection for detecting whether there is any packet conforming to a predetermined characteristic being transmitted in the wireless communication channel according to some specific characteristic profiles. For example, since the Orthogonal Frequency-Division Multiplexing (OFDM) packet have a property of repetition, the collision detection device 120/420 may perform packet characteristic detection according to such repetition property, so as to determine whether the detected signal/energy is an OFDM packet. The collision detection device 120/420 may determine whether the detected signal/energy is noise or a packet by filtering and judging the detected energy according to the specific characteristic profiles. According to an embodiment of the invention, when the detected energy is determined as the noise, the processor 140/440 may not regard it as a collision, or may not adjust the transmission parameter according to the detection result. On the contrary, when the detected energy is determined as the energy of a packet, the processor 140/440 may adjust the transmission parameter according to the detection result.

According to an embodiment of the invention, when the collision detection device 120/420 has detected energy during the time interval T1, the collision detection device 120/420 may notify the radio transceiver 130/430 and the radio transceiver 130/430 may try to cancel subsequent transmission scheduling. When the time at which the energy is detected is early enough, the subsequent transmission scheduling can be successfully cancelled, so as to avoid undesired collision. If it is unable to cancel the subsequent transmission scheduling, the detection result can be recorded for further adjusting the transmission parameters in the future.

According to an embodiment of the invention, the processor 140/440 may be further configured to count a number of collisions occurred during different time intervals according to the detection result obtained during the time interval T1, T2 and/or T3, so as to obtain a corresponding statistical result and adjust the transmission parameter according to the statistical result. The transmission parameter may be selected from a group comprising a transmission rate, a contention window length, enablement of a Request to Send (RTS)-Clear to Send (CTS) mechanism, enablement of a retransmission mechanism, enablement of a frame aggregation mechanism, enablement of a transmission opportunity (TxOP), a length of the transmission opportunity, a transmission power, a transmission bandwidth and a transmission band.

For example, suppose that the communication device 100/400 has transmitted 1000 packets during a predetermined time interval, and 700 packets out of the 1000 packets have been successfully transmitted and the transmissions of the remaining 300 packets have failed, in the conventional design, reduction of the transmission rate may be determined if only such information is provided for judging the transmission performance. However, in the embodiments of the invention, the processor 140/440 may further calculate the number of collisions occurred during the predetermined time interval is 250 based on the detection result, and re-calculate the actual transmission failure rate as 6.7% according to the statistical result. The processor 140/440 may further determine how to adjust the transmission rate based on the obtained transmission failure rate (and adjustment will be smaller than the case when the transmission failure rate is 30%), or may determine that there is no need to adjust the transmission rate. In this manner, the case that the transmitter mistakenly thinks that the transmission rate is too high to cause an error to occur may be avoided. In addition, the processor 140/440 may further determine whether to adjust the packet transmission time according to the statistical result, so as to avoid another collision to occur.

For another example, the waiting time in the 802.11 system is a randomly generated contention window plus a Distributed Coordination Function (DCF) Interval Frame Space (DIFS). When the processor 140/440 determines that the collision probability is too high according to the statistical result, the processor 140/440 may adjust the method of selecting the contention window. For example, the method of selecting the contention window may adjusted by enlarging the range of values utilized for select the random value, so as to adjust the contention window length and further reduce the collision probability.

For yet another example, the Request to Send (RTS)-Clear to Send (CTS) mechanism has been defined in the 802.11 communication standards, but the timing of using the RTS-CTS mechanism is not specified in the standards. The processor 140/440 may determine whether to enable the RTS-CTS mechanism according to the statistical result. For example, when the collision probability is too high, the processor 140/440 may determine to enable the RTS-CTS mechanism in subsequent packet transmissions.

For yet another example, since there is no Acknowledge message associated with a broadcast or a multicast packet, the transmitter is unable to confirm whether the broadcast or a multicast packet has been successfully received by the receiver. Therefore, the processor 140/440 may determine whether to enable a retransmission mechanism for a broadcast or a multicast packet. For example, when the collision probability is too high, the processor 140/440 may determine to enable the retransmission mechanism in subsequent packet transmissions.

For yet another example, the processor 140/440 may determine whether to enable the frame aggregation mechanism or adequately adjust the number of aggregated frames according to the statistical result, so as to optimize the channel efficiency. The frame aggregation mechanism is to aggregate multiple packets together as one packet, so as to reduce the number of times of performing transmission resource contention, and thereby the improving the channel efficiency. For example, when the collision probability is too high, the processor 140/440 may determine to disable the frame aggregation mechanism or reduce the number of aggregated frames.

For yet another example, transmission opportunity (TxOP) is defined in the 802.11e Quality of Service (QoS) standards as a way to improve the channel efficiency. The parameter "TxOP limit" represents the maximum length for one transmission. During the TxOP period, packets will be transmitted one after one without re-contending the right of using the channel. However, once collision has occurred during the TxOP period, successive collision may further occur, seriously affecting the channel efficiency. Therefore, the processor 140/440 may determine whether to enable the transmission opportunity and/or whether to adjust the length of a TxOP period according to the statistical result. For example, when the collision probability is too high, the processor 140/440 may determine to disable or not to use the transmission opportunity for subsequent transmission, or to reduce the length of a TxOP period.

For still another example, the collision detection device 120/420 may notify the processor 140/440 of the strength of the detected energy, and the processor 140/440 may determine whether to adjust the transmission power based on this information. For example, when the energy of interference is too high, the processor 140/440 may increase the transmission power so as to increase the signal to noise ratio (SNR) for subsequent transmission and reduce the transmission failure rate.

Besides the aforementioned applications, in an embodiment of the invention, the collision detection device 120/420 may further perform full-band collision detection. To be more specific, the collision detection device 120/420 may use a filter for filtering the signal received from the air interface, and the bandwidth and the filtering range of the filter may be set as the bandwidth and the range of the whole frequency band utilized by the communication device 100/400 for performing wireless communication, and the collision detection device 120/420 may perform full-band collision detection according to the filtered signal.

In another embodiment of the invention, the collision detection device 120/420 may individually perform collision detection in a plurality of sub-bands. To be more specific, the frequency band in which the communication device 100/400 performs wireless communication may be divided into a plurality of sub-bands. The collision detection device 120/420 may use a plurality of filters for filtering the signal received from the air interface, and the filtering range of the filters may be set according to the frequency and bandwidth of a corresponding sub-band, so as to separate the signal component corresponding to each sub-band. The collision detection device 120/420 may perform collision detection in each sub-band according to the filtered signal and provide the detection result corresponding to each sub-band to the processor 140/440. The processor 140/440 may determine whether to use smaller bandwidth for the subsequent transmission, and/or select the sub-bands having smaller number of collisions for the subsequent transmission, so as to adjust the transmission band and/or the transmission bandwidth and thereby reducing the collision probability.

Figure 6:
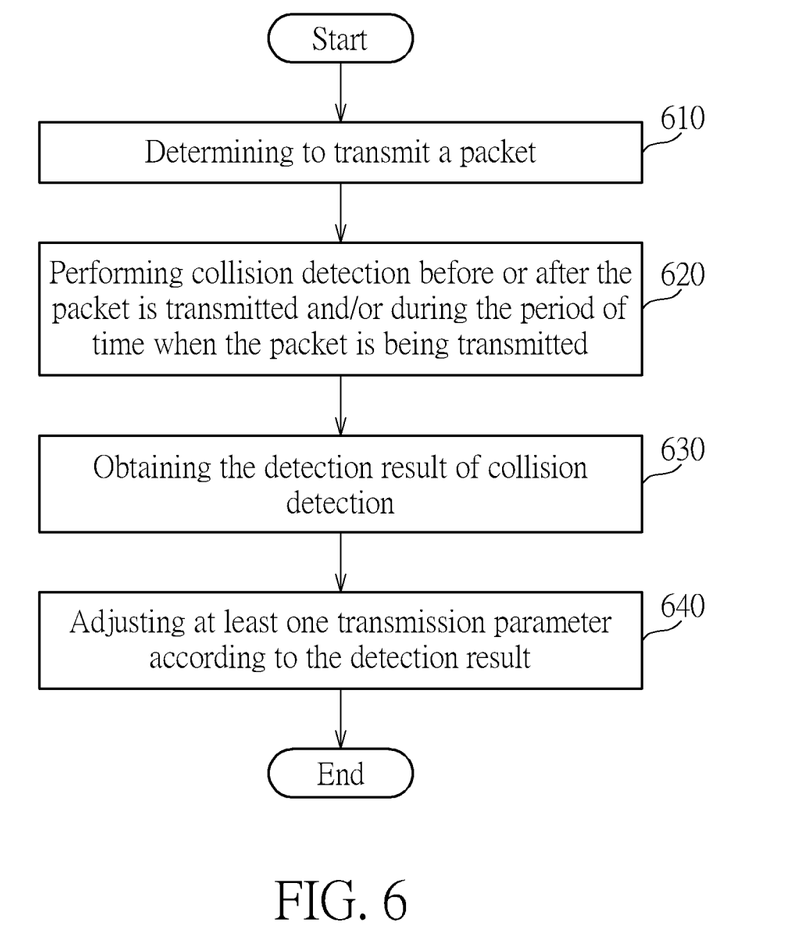
FIG. 6 is an exemplary flow chart of a method for adjusting a transmission parameter according to an embodiment of the invention.

FIG. 6 is an exemplary flow chart of a method for adjusting a transmission parameter according to an embodiment of the invention.

Step 610: the communication device may determine to transmit a packet. As discussed above, the MAC layer may determine to transmit a packet after determining that the channel is clear.

Step 620: the communication device may perform collision detection before or after the packet is transmitted and/or during the period of time when the packet is being transmitted.

Step 630: obtaining the detection result of collision detection.

Step 640: adjusting at least one transmission parameter according to the detection result.

By combining the proposed mechanisms or methods for detecting collision and adjusting transmission parameters, the collision can be effectively detected and the transmission parameter can be correctly adjusted. In this manner, the transmission performance can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
   a radio transceiver, configured to transmit or receive wireless signals and comprising:
      a collision detection device, configured to detect energy in a wireless communication channel during a first time interval before a packet is transmitted by the radio transceiver and accordingly generate a detection result; and
   a processor, configured to adjust at least one transmission parameter according to the detection result,
   wherein the first time interval covers a period of time for the radio transceiver to switch from a receiving state to a transmitting state, and
   the collision detection device is further configured to detect energy in the wireless communication channel during a second time interval after the packet has been transmitted by the radio transceiver and accordingly generate the detection result, and the second time interval starts when the radio transceiver completes transmission of the packet, and
   wherein the second time interval covers a period of time for the radio transceiver to switch from the transmitting state to the receiving state.

2. The communication device of claim 1, wherein the collision detection device is further configured to detect whether there is any packet conforming to a predetermined characteristic being transmitted in the wireless communication channel during the second time interval and accordingly generate the detection result.

3. The communication device of claim 1, wherein the processor is further configured to count a number of collisions occurred during the first time interval according to the detection result to obtain a statistical result and adjust the at least one transmission parameter according to the statistical result.

4. The communication device of claim 3, wherein the at least one transmission parameter is selected from a group comprising a transmission rate, a contention window length, enablement of a Request to Send (RTS)-Clear to Send (CTS) mechanism, enablement of a retransmission mechanism, enablement of a frame aggregation mechanism, enablement of a transmission opportunity (TxOP), a length of the transmission opportunity, a transmission power, a transmission bandwidth and a transmission band.

5. The communication device of claim 1, wherein the communication device operates in compliance with a Carrier Sense Multiple Access (CSMA) or a Collision Avoidance (CA) protocol.

6. A communication device, comprising:
   a radio transceiver, configured to transmit or receive wireless signals and comprising:
      a collision detection device, configured to detect energy in a wireless communication channel during a first time interval before a packet is transmitted by the radio transceiver and accordingly generate a detection result; and
   a processor, configured to adjust at least one transmission parameter according to the detection result,
   wherein the first time interval covers a period of time for the radio transceiver to switch from a receiving state to a transmitting state, and
   the collision detection device is further configured to detect at least one of energy in the wireless communication channel and whether there is any packet conforming to a predetermined characteristic being transmitted in the wireless communication channel during a second time interval when the radio transceiver is transmitting the packet, and accordingly generate the detection result.

7. The communication device of claim 6, further comprising:
a feedback signal eliminating device, configured to receive a detection signal and generate a processed signal according to the detection signal and a transmission signal of the radio transceiver.

8. The communication device of claim 7, wherein the feedback signal eliminating device generates the processed signal by subtracting the transmission signal from the detection signal, and the collision detection device is configured to detect the at least one of energy in the wireless communication channel and whether there is any packet conforming to the predetermined characteristic being transmitted in the wireless communication channel during the second time interval according to the processed signal.

9. The communication device of claim 6, wherein the processor is further configured to count a number of collisions occurred during the first time interval according to the detection result to obtain a statistical result and adjust the at least one transmission parameter according to the statistical result.

10. The communication device of claim 9, wherein the at least one transmission parameter is selected from a group comprising a transmission rate, a contention window length, enablement of a Request to Send (RTS)-Clear to Send (CTS) mechanism, enablement of a retransmission mechanism, enablement of a frame aggregation mechanism, enablement of a transmission opportunity (TxOP), a length of the transmission opportunity, a transmission power, a transmission bandwidth and a transmission band.

11. The communication device of claim 6, wherein the communication device operates in compliance with a Carrier Sense Multiple Access (CSMA) or a Collision Avoidance (CA) protocol.

12. A method for adjusting a transmission parameter, comprising:
detecting energy in a wireless communication channel during a first time interval before a packet is transmitted by a communication device and accordingly generating a detection result;
adjusting at least one transmission parameter according to the detection result, wherein the first time interval covers a period of time for a radio transceiver of the communication device to switch from a receiving state to a transmitting state; and
detecting energy in the wireless communication channel during a second time interval after the packet has been transmitted by the radio transceiver and accordingly generating the detection result, wherein the second time interval starts when the radio transceiver completes transmission of the packet, wherein the second time interval covers a period of time for the radio transceiver to switch from the transmitting state to the receiving state.

13. The method of claim 12, further comprising:
detecting whether there is any packet conforming to a predetermined characteristic being transmitted in the wireless communication channel during the second time interval, and accordingly generating the detection result.

14. The method of claim 12, further comprising:
detecting at least one of energy in the wireless communication channel and whether there is any packet conforming to a predetermined characteristic being transmitted in the wireless communication channel during a third time interval when the radio transceiver is transmitting the packet, and accordingly generating the detection result.

15. The method of claim 14, further comprising:
receiving a detection signal during the third time interval when the radio transceiver is transmitting the packet; and
generating a processed signal according to the detection signal and a transmission signal of the radio transceiver.

16. The method of claim 15, wherein the step of generating the processed signal according to the detection signal and the transmission signal of the radio transceiver further comprises:
subtracting the transmission signal from the detection signal, and
wherein detection of the at least one of energy in the wireless communication channel and whether there is any packet conforming to the predetermined characteristic being transmitted in the wireless communication channel is performed according to the processed signal during the third time interval.

17. The method of claim 12, wherein the step of adjusting at least one transmission parameter according to the detection result further comprises:
counting a number of collisions occurred during the first time interval according to the detection result to obtain a statistical result, and
wherein the at least one transmission parameter is adjusted according to the statistical result.

18. The method of claim 17, wherein the at least one transmission parameter is selected from a group comprising a transmission rate, a contention window length, enablement of a Request to Send (RTS)-Clear to Send (CTS) mechanism, enablement of a retransmission mechanism, enablement of a frame aggregation mechanism, enablement of a transmission opportunity (TxOP), a length of the transmission opportunity, a transmission power, a transmission bandwidth and a transmission band.

19. The method of claim 12, wherein the communication device operates in compliance with a Carrier Sense Multiple Access (CSMA) or a Collision Avoidance (CA) protocol.

* * * * *